US008319142B2

(12) United States Patent
Hussary et al.

(10) Patent No.: US 8,319,142 B2
(45) Date of Patent: Nov. 27, 2012

(54) CONTOURED SHIELD ORIFICE FOR A PLASMA ARC TORCH

(75) Inventors: Nakhleh Hussary, Lebanon, NH (US); Christopher Conway, Wilmot, NH (US); Thierry Renault, Enfield, NH (US); Darrin MacKenzie, Windsor, VT (US)

(73) Assignee: Thermal Dynamics Corporation, West Lebanon, NH (US)

( * ) Notice: Subject to any disclaimer, the term of this patent is extended or adjusted under 35 U.S.C. 154(b) by 269 days.

(21) Appl. No.: 12/772,882

(22) Filed: May 3, 2010

(65) Prior Publication Data

US 2010/0206853 A1 Aug. 19, 2010

Related U.S. Application Data

(63) Continuation of application No. 11/510,822, filed on Aug. 25, 2006, now Pat. No. 7,737,383.

(51) Int. Cl.
*B23K 10/00* (2006.01)

(52) U.S. Cl. .................. 219/121.5; 219/121.51; 219/75; 219/121.52

(58) Field of Classification Search ............... 219/121.5, 219/121.52, 75, 74, 121.49, 121.48, 121.51
See application file for complete search history.

(56) References Cited

U.S. PATENT DOCUMENTS 3,567,898 A 3/1971 Fein
4,743,734 A 5/1988 Garlanov et al.
4,861,962 A 8/1989 Sanders et al.
4,882,465 A * 11/1989 Smith et al. .............. 219/121.48
5,079,403 A 1/1992 Sturges et al.
5,124,525 A 6/1992 Severance, Jr. et al.
5,132,512 A 7/1992 Sanders et al.
5,220,150 A 6/1993 Pfender et al.
5,660,743 A 8/1997 Nemchinsky
5,695,662 A 12/1997 Couch, Jr. et al.
5,856,647 A 1/1999 Luo
5,901,551 A * 5/1999 Butler .......................... 60/203.1
6,084,199 A 7/2000 Lindsay et al.
6,096,992 A 8/2000 Severance, Jr.
6,207,923 B1 3/2001 Lindsay
6,686,555 B2 * 2/2004 Bayer et al. .............. 219/121.46
2003/0034333 A1 * 2/2003 Horner-Richardson et al. ........................ 219/121.51

FOREIGN PATENT DOCUMENTS

DE 40 30 541 4/1992
JP 04-206399 7/1992
WO 98-16091 4/1998

* cited by examiner

Primary Examiner — Mark Paschall
(74) *Attorney, Agent, or Firm* — Brinks Hofer Gilson & Lione

(57) ABSTRACT

A component for use in a plasma arc torch is provided that includes an orifice that defines a continuously changing cross-sectional size along the length of a surface of the orifice from an inlet portion to an outlet portion. The surface extends along the component and directs a flow of shield gas at a predetermined angle to result in a specific pierce or cut location on a workpiece. In one form, the component is a shield cap. The continuously changing surface may be convergent, divergent, or a combination of convergent and divergent according to the principles of the present disclosure. Additionally, the shield cap may comprise a single, unitary piece or alternately a plurality of pieces or components.

23 Claims, 16 Drawing Sheets

CONTOURED SHIELD ORIFICE FOR A PLASMA ARC TORCH

This application is a continuation of U.S. application Ser. No. 11/510,822 filed on Aug 25, 2006, which has issued as U.S. Pat. No. 7,737,383 on Jun. 15, 2010. The disclosure of the above application is incorporated herein by reference in its entirety.

FIELD

The present disclosure relates to plasma arc torches and more specifically to devices and methods for controlling shield gas flow in a plasma arc torch.

BACKGROUND

The statements in this section merely provide background information related to the present disclosure and may not constitute prior art.

Plasma arc torches, also known as electric arc torches, are commonly used for cutting, marking, gouging, and welding metal workpieces by directing a high energy plasma stream consisting of ionized gas particles toward the workpiece. In a typical plasma arc torch, the gas to be ionized is supplied to a distal end of the torch and flows past an electrode before exiting through an orifice in the tip, or nozzle, of the plasma arc torch. The electrode has a relatively negative potential and operates as a cathode. Conversely, the torch tip constitutes a relatively positive potential and operates as an anode during piloting. Further, the electrode is in a spaced relationship with the tip, thereby creating a gap, at the distal end of the torch. In operation, a pilot arc is created in the gap between the electrode and the tip, often referred to as the plasma arc chamber, wherein the pilot arc heats and subsequently ionizes the gas. The ionized gas is blown out of the torch and appears as a plasma stream that extends distally off the tip. As the distal end of the torch is moved to a position close to the workpiece, the arc jumps or transfers from the torch tip to the workpiece with the aid of a switching circuit activated by the power supply. Accordingly, the workpiece serves as the anode, and the plasma arc torch is operated in a "transferred arc" mode.

In many plasma arc torches, secondary gas flow is used to control cut quality of the main plasma stream and to provide cooling to consumable components of the plasma arc torch. Generally, two (2) primary methods of introducing the secondary gas have been used in the art. In the first method, secondary gas is directed towards and impinges directly upon the plasma stream. Such a method is used primarily in automated plasma arc torches having relatively high cutting precision, as compared with manual methods. In the second method, the secondary gas is introduced coaxially with the plasma stream such that a curtain of secondary gas is formed around the plasma stream, which does not directly impinge upon the plasma stream.

Improved methods of introducing the secondary gas are continuously desired in the field of plasma arc cutting in order to improve both cut quality and cutting performance of the plasma arc torch.

SUMMARY

In one form of the present disclosure, a plasma arc torch is provided that comprises an electrode disposed within the plasma arc torch and adapted for electrical connection to a cathodic side of a power supply. A tip is positioned distally from the electrode and is adapted for electrical connection to an anodic side of the power supply during piloting. Additionally, a shield cap is positioned distally from the tip and is electrically isolated from the power supply, and the shield cap comprises an exit orifice that defines a continuously changing cross-sectional size along the length of the exit orifice from an inlet portion to an outlet portion at a distal end of the shield cap. The exit orifice may have a convergent configuration, a divergent configuration, or a combination of a convergent-divergent configuration. Moreover, the shield cap may be a single piece or instead may comprise a plurality of pieces. The shield cap may also include vent passageways.

In another form of the present disclosure, a shield cap for use in a plasma arc torch is provided that comprises a body defining a proximal end portion having an attachment area for securing the shield cap to the plasma arc torch, and an exit orifice extending through a central portion of the body. The exit orifice defines a continuously changing cross-sectional size along the length of the exit orifice from an inlet portion to an outlet portion at a distal end of the body.

In yet another form of the present disclosure, a shield cap for use in a plasma arc torch is provided that comprises an exit orifice extending through a central portion of the shield cap. The exit orifice defines an inlet portion, an outlet portion that meets a plasma stream, and a continuously changing cross-sectional size along the length of the exit orifice from the inlet portion to the outlet portion.

Additionally, a component for use in a plasma arc torch is disclosed that is not necessarily a shield cap, wherein the component comprises an orifice that defines a continuously changing cross-sectional size along the length of a surface of the orifice from an inlet portion to an outlet portion such that the size of the orifice is different from one location to the next successive location along the length of the surface of the orifice. The surface directs a flow of shield gas at a predetermined angle to result in a specific pierce or cut location on a workpiece.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 7B:
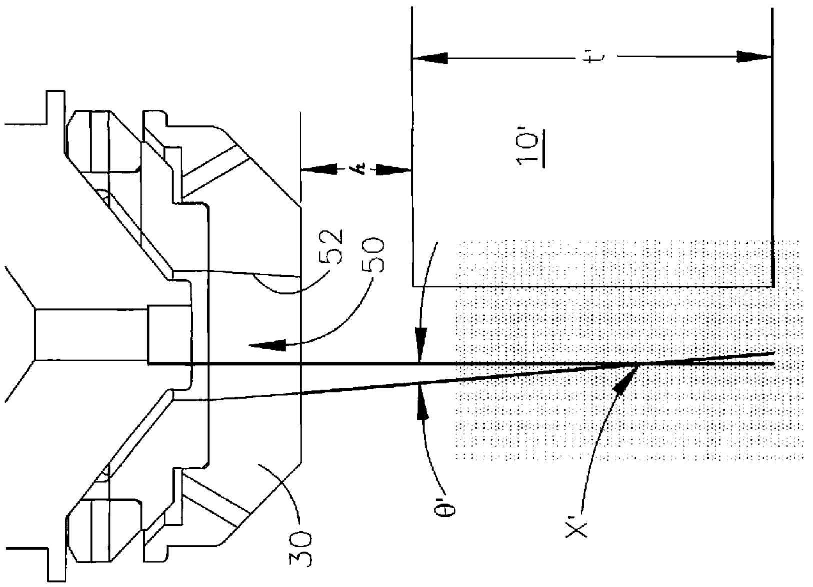
Figure 7A:
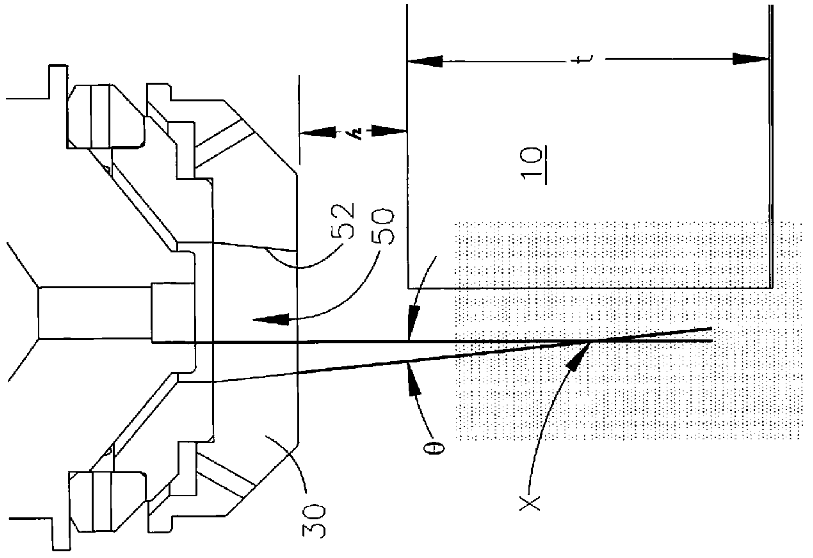
Figure 8A:
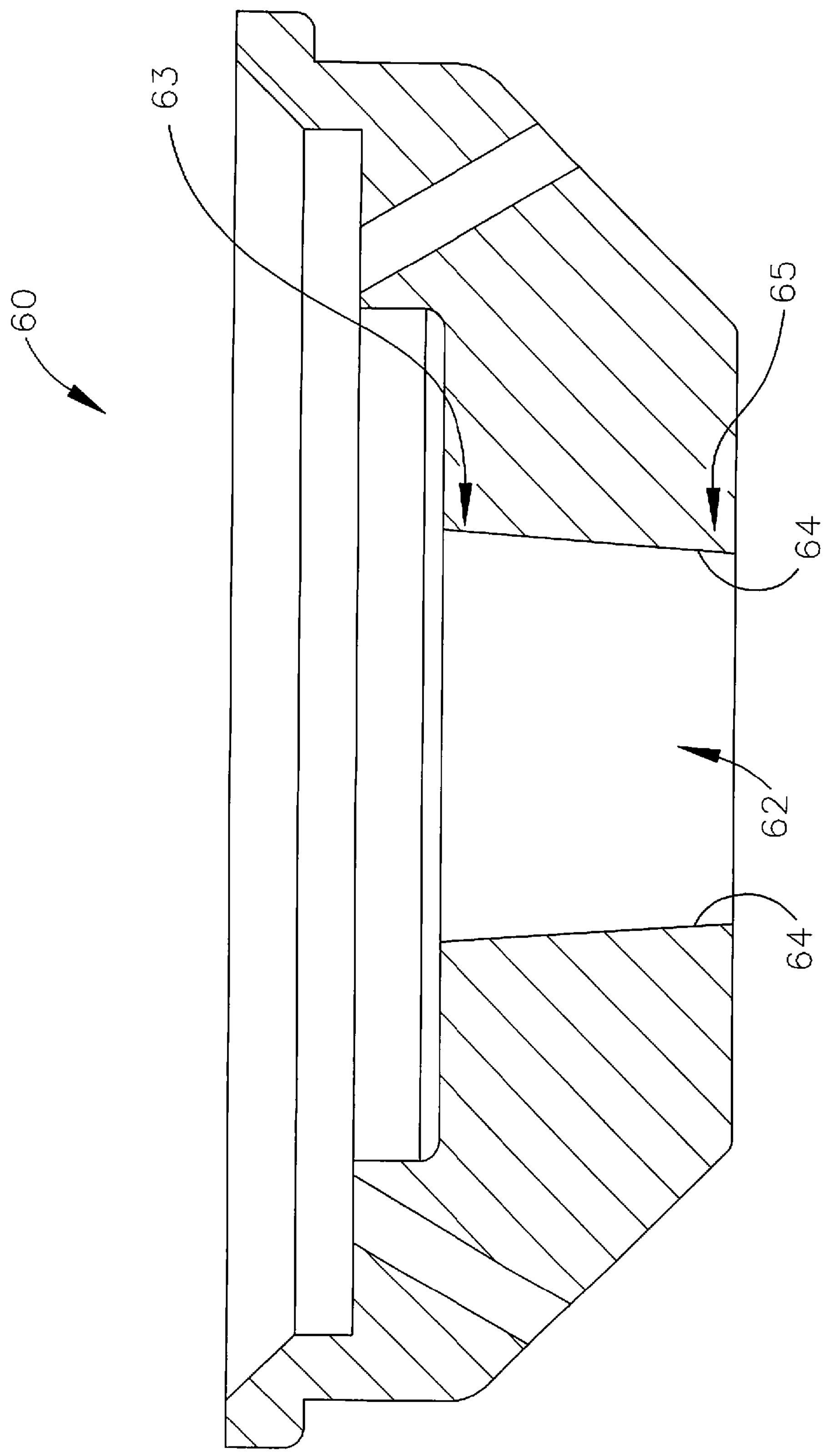
Figure 8B:
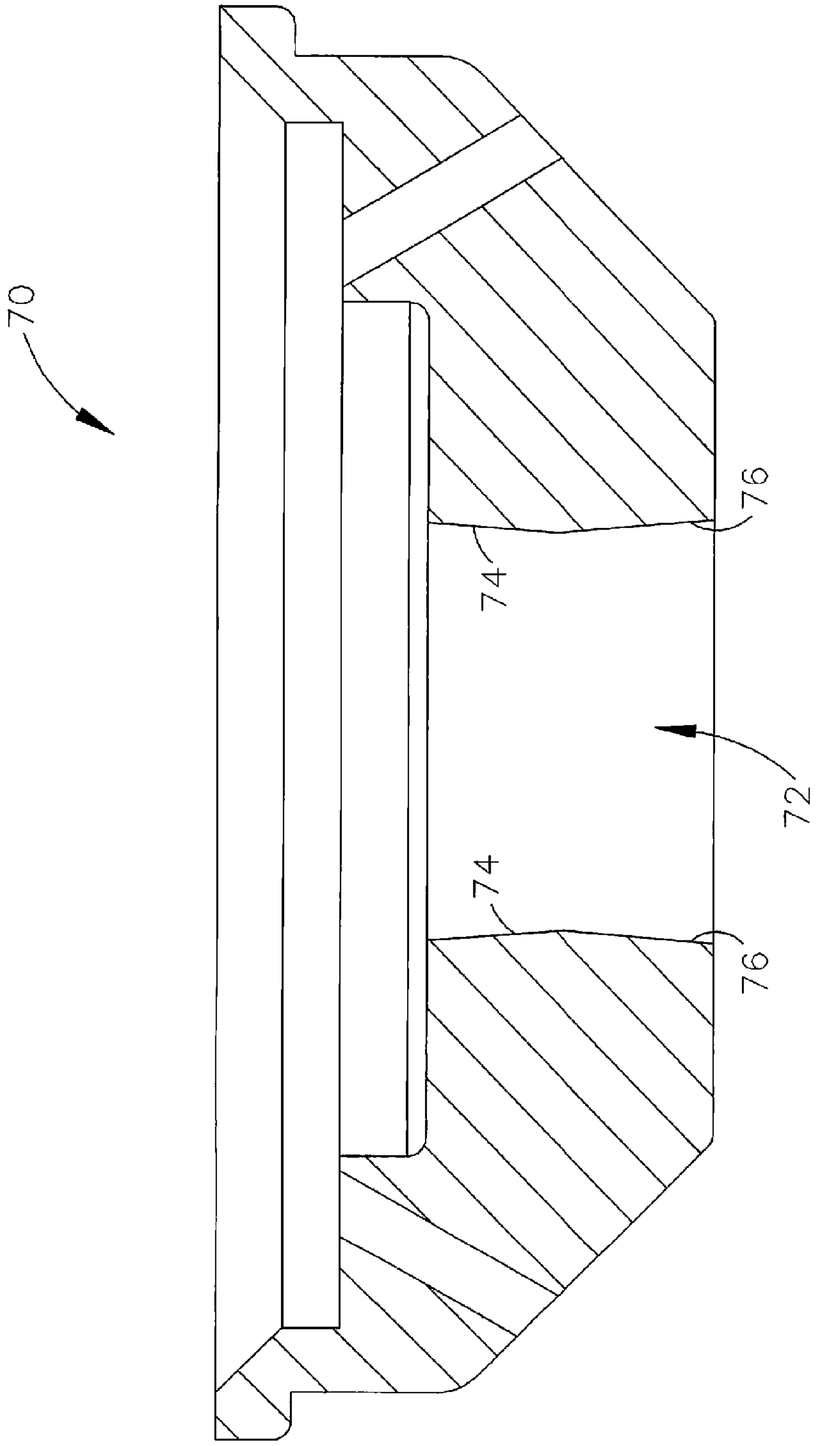
Figure 8C:
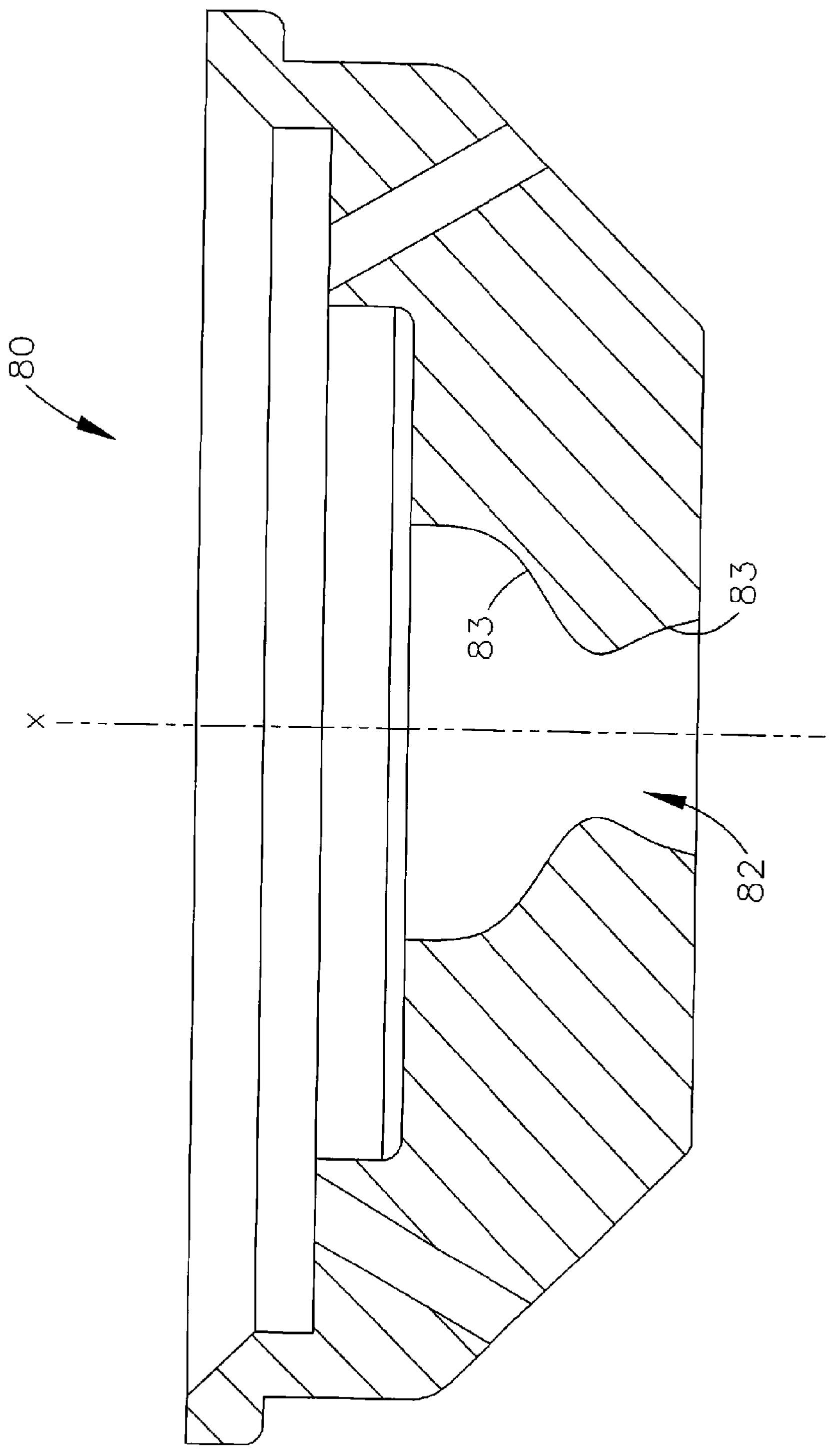
Figure 9A:
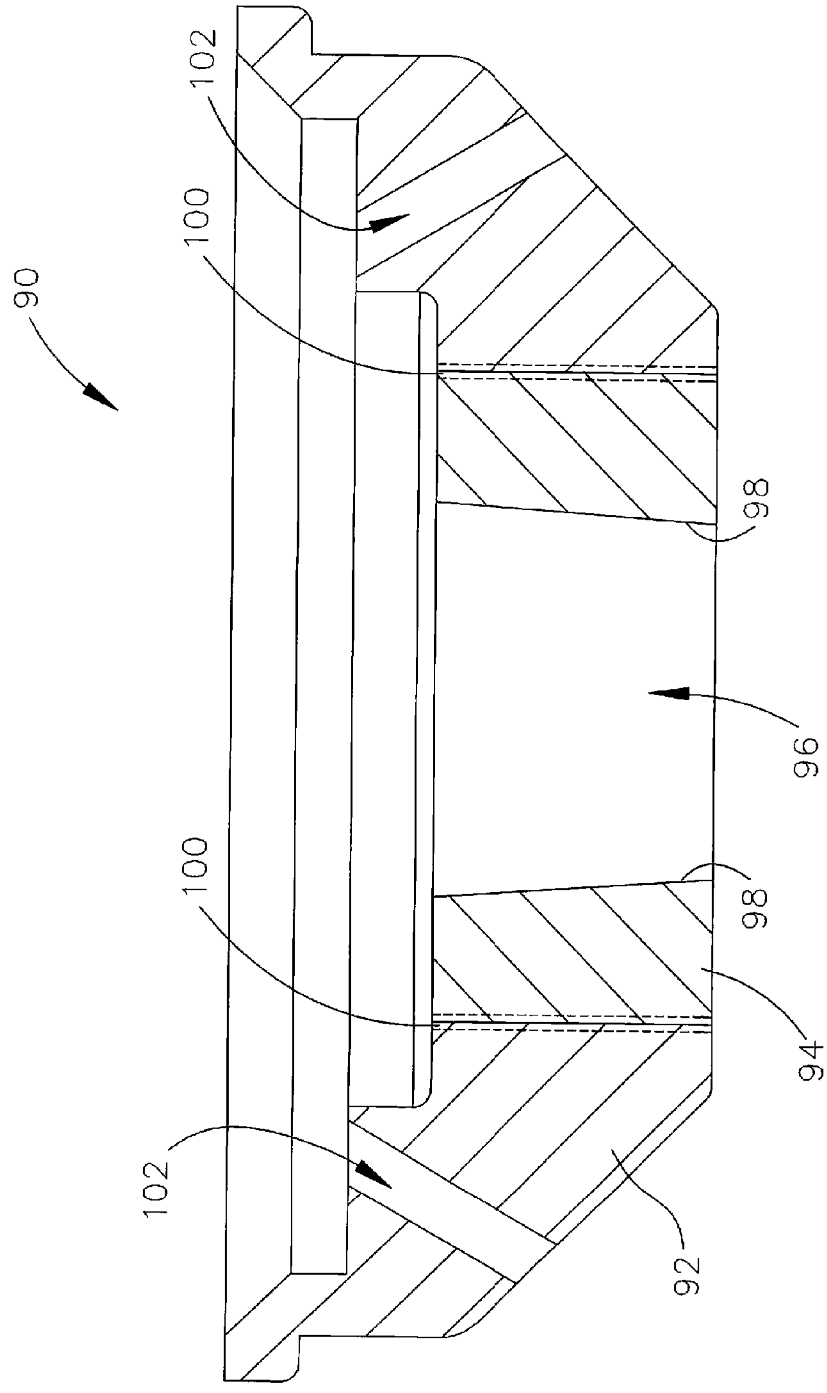
Figure 9B:
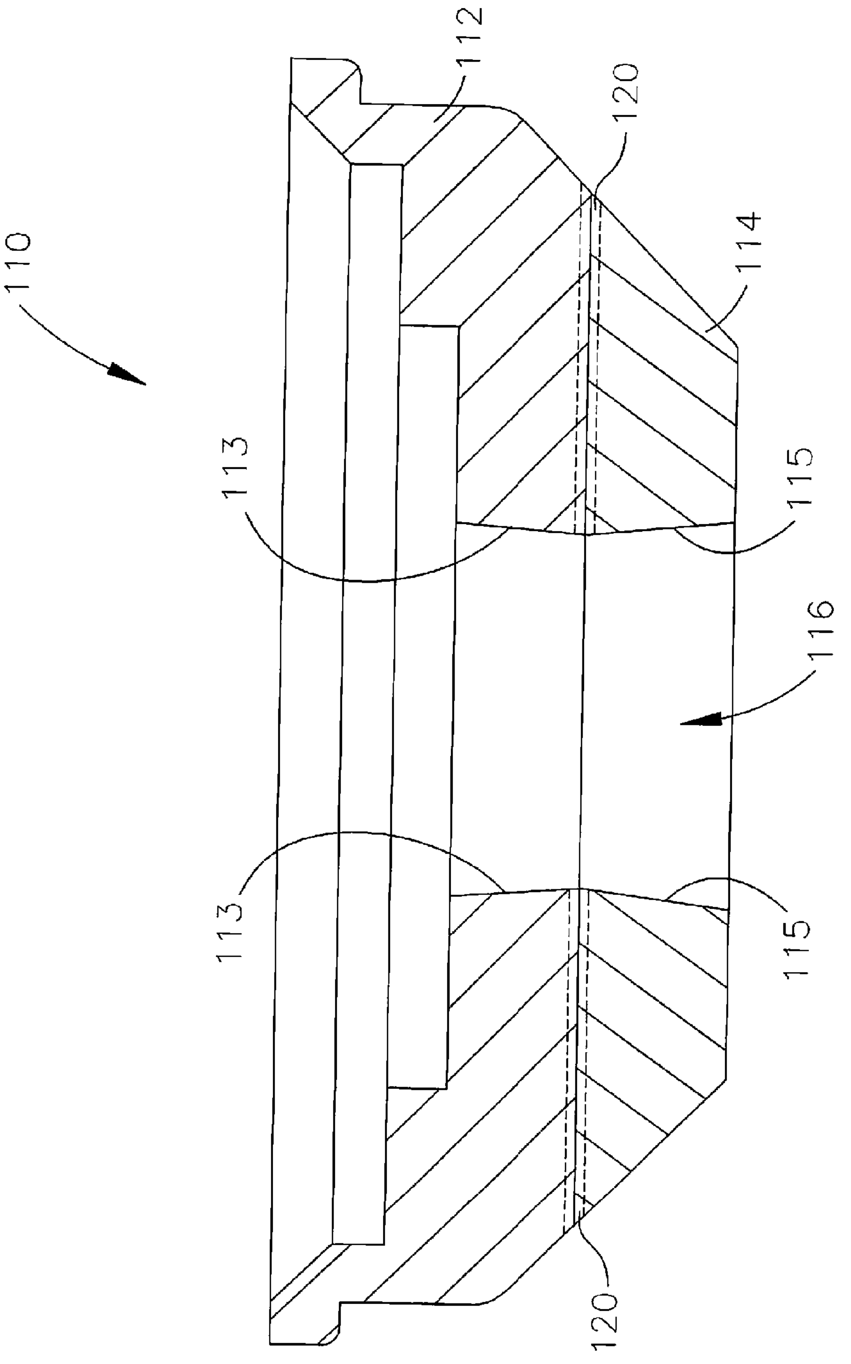
Figure 10:
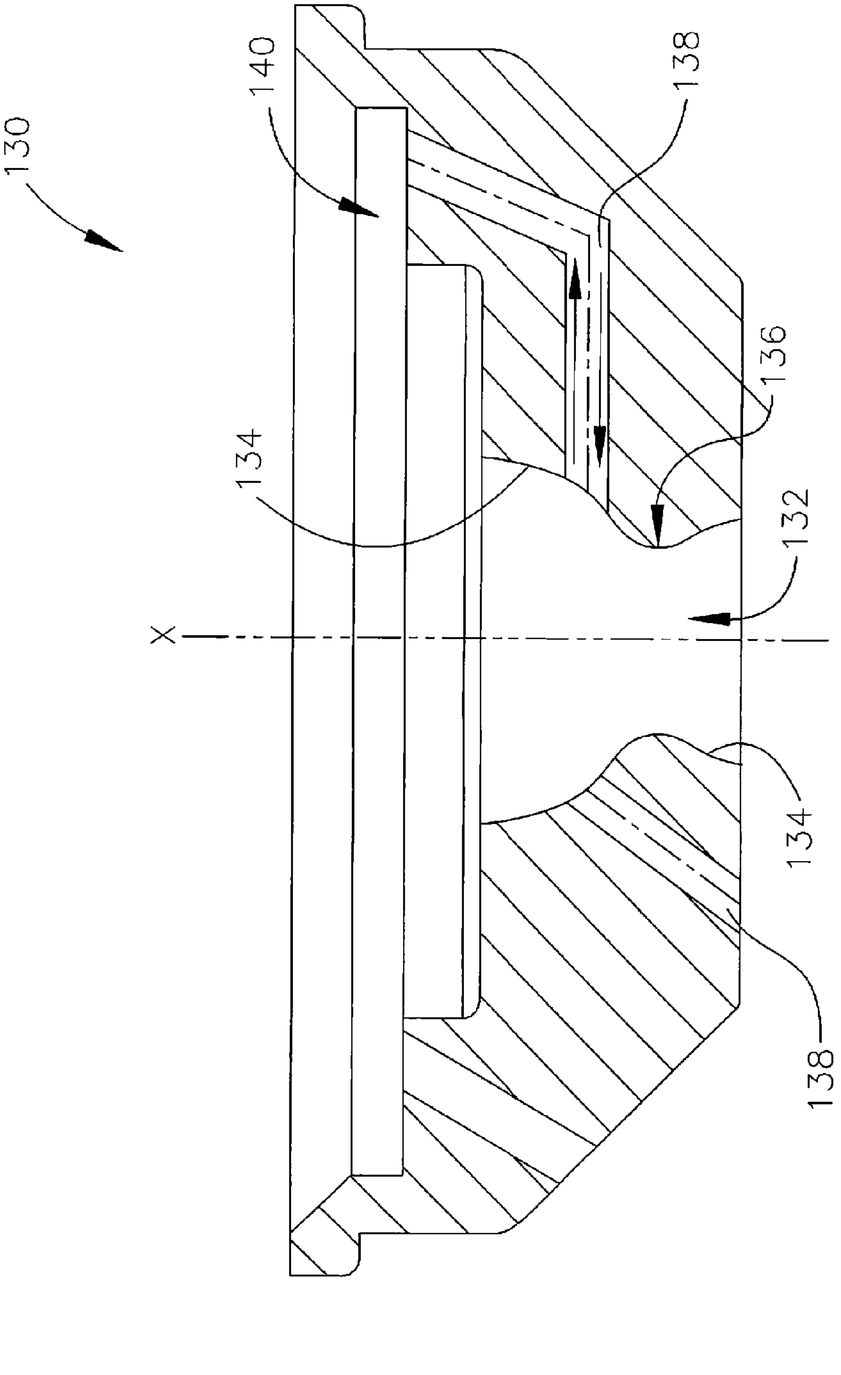
Figure 11:
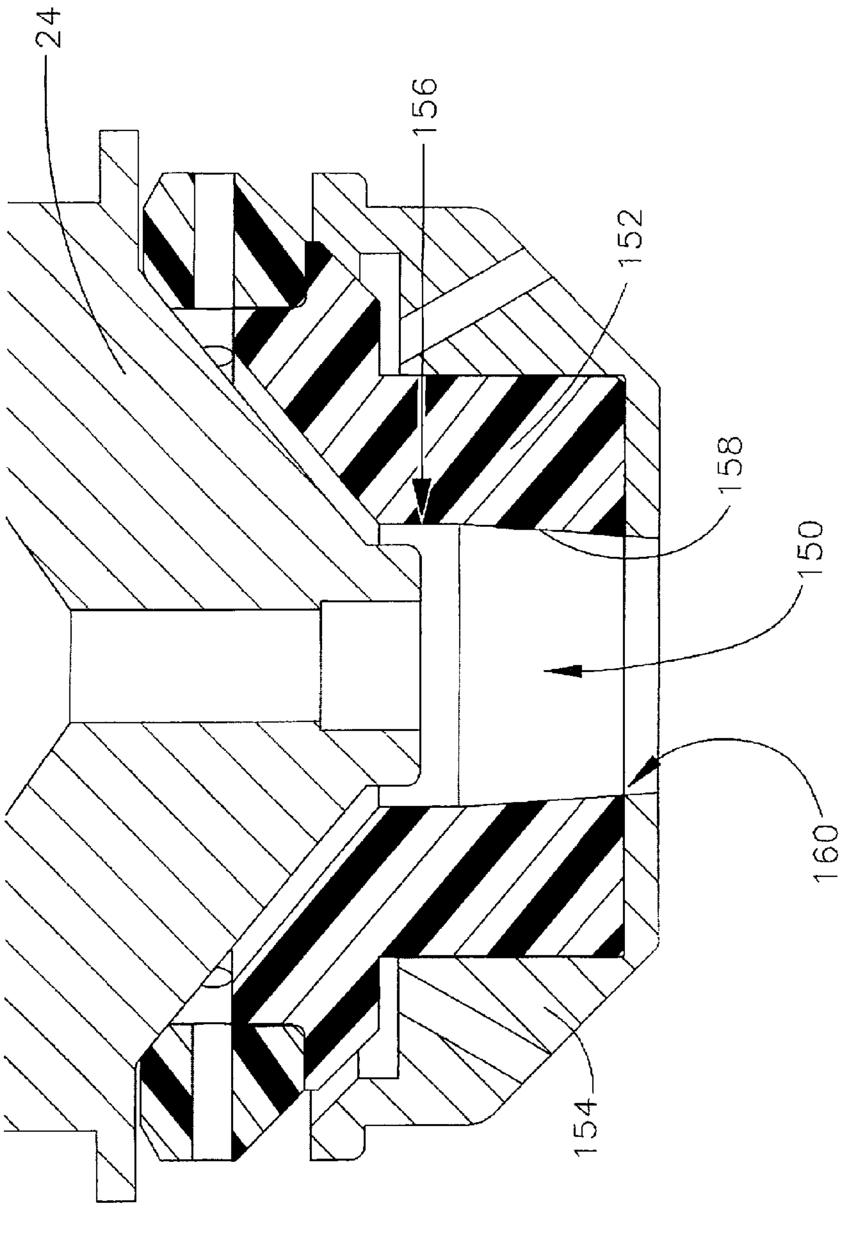
Figure 12:
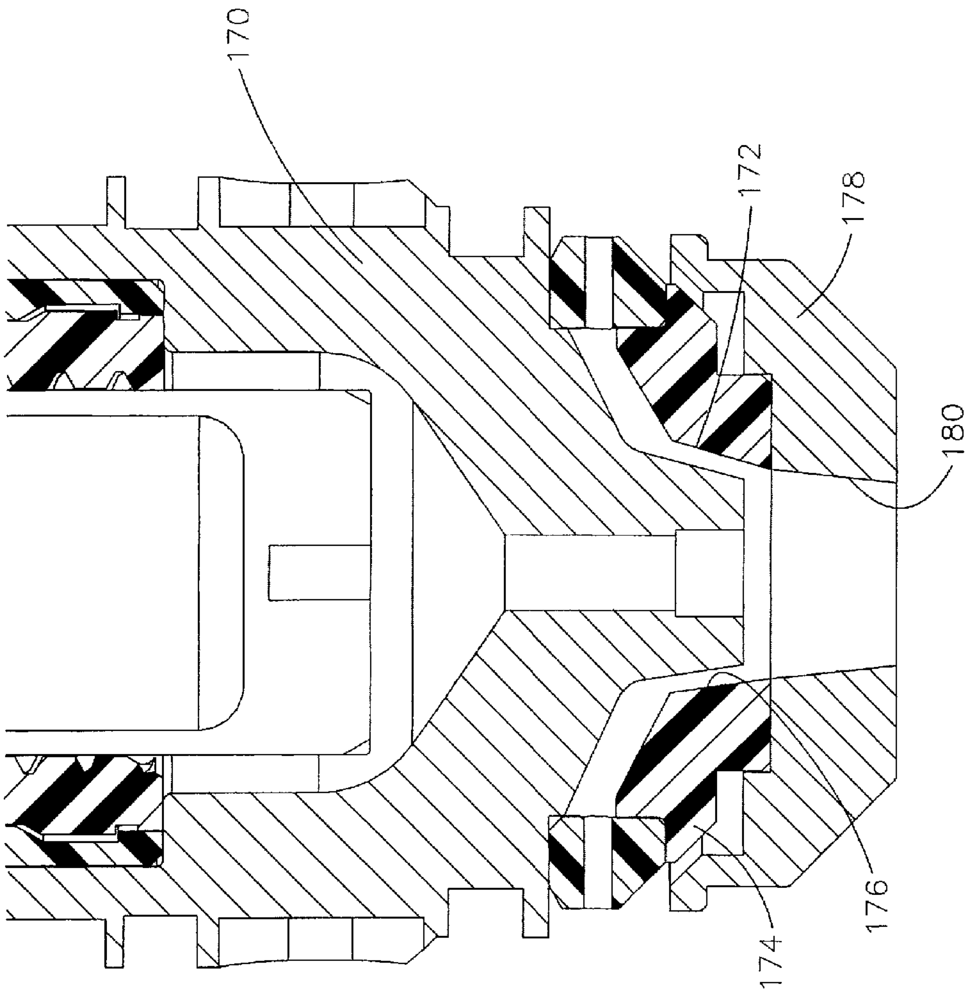
Figure 13:
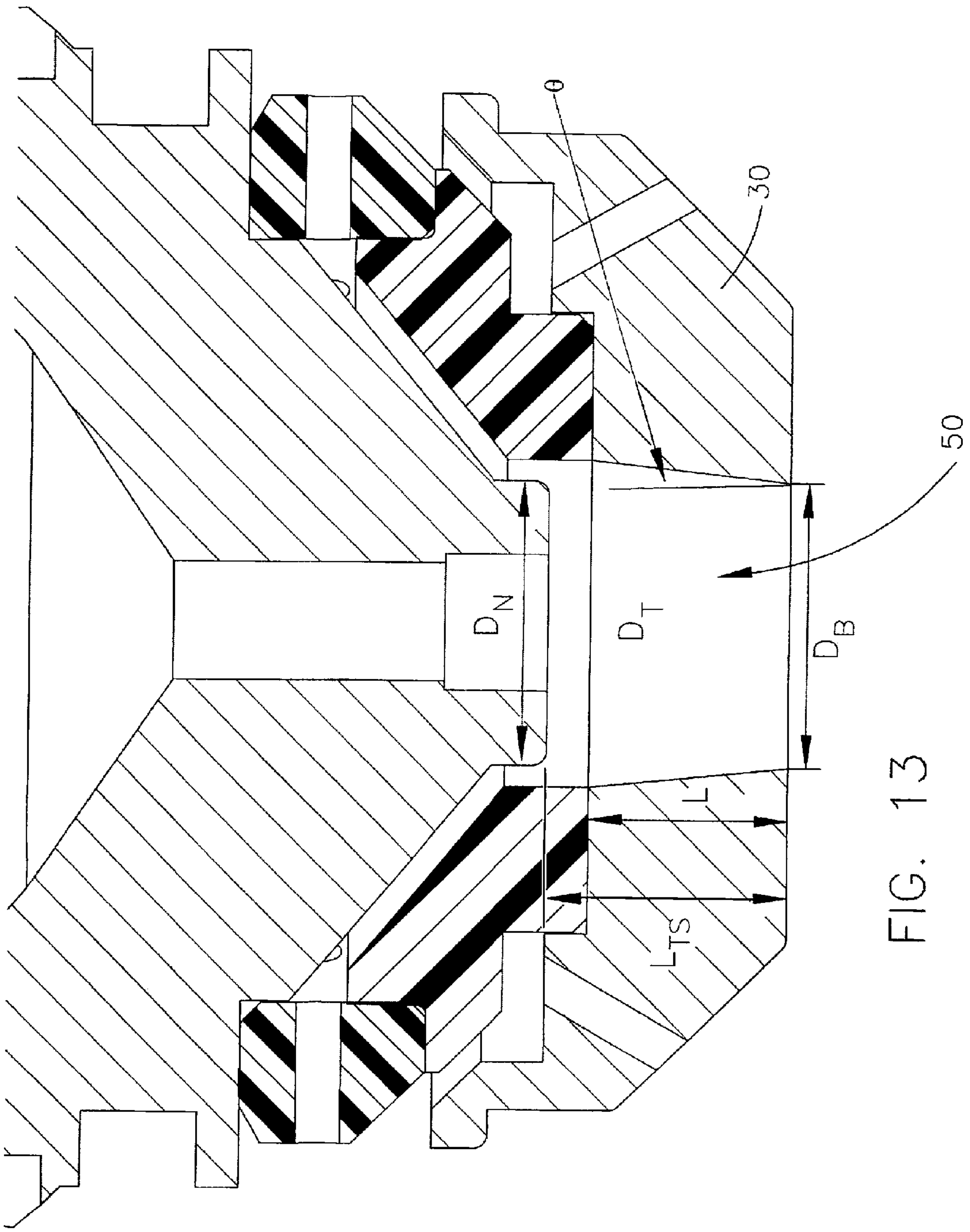

FIG. 7*a* is a cross-sectional view of a continuously contoured exit orifice having a shield angle θ, which results in a specific pierce or cut location on a workpiece in accordance with the principles of the present disclosure;

FIG. 7*b* is a cross-sectional view of a continuously contoured exit orifice having a shield angle θ', which results in a different pierce or cut location on a workpiece in accordance with the principles of the present disclosure;

FIG. 8*a* is a cross-sectional view of an alternate form of a contoured shield orifice constructed in accordance with the principles of the present disclosure;

FIG. 8*b* is a cross-sectional view of another alternate form of a contoured shield orifice constructed in accordance with the principles of the present disclosure;

FIG. 8*c* is a cross-sectional view of yet another alternate form of a contoured shield orifice constructed in accordance with the principles of the present disclosure;

FIG. 9*a* is a cross-sectional view of an alternate form of a shield cap comprising a plurality of pieces stacked in a horizontal configuration and constructed in accordance with the principles of the present disclosure;

FIG. 9*b* is a cross-sectional view of another alternate form of a shield cap comprising a plurality of pieces stacked in a vertical configuration and constructed in accordance with the principles of the present disclosure;

FIG. 10 is a cross-sectional view of another alternate form of the present disclosure illustrating vent passageways formed through a continuously contoured orifice and constructed in accordance with the principles of the present disclosure;

FIG. 11 is a cross-sectional view of another alternate form of the present disclosure illustrating a continuously contoured orifice being formed in a different component of the plasma arc torch other than the shield cap and constructed in accordance with the principles of the present disclosure;

FIG. 12 is a cross-sectional view of still another alternate form of the present disclosure illustrating a plurality of cooperating continuously contoured surfaces defined by a corresponding plurality of components and constructed in accordance with the principles of the present disclosure; and FIG. 13 is an enlarged cross-sectional view of an exemplary shield cap and contoured shield orifice with various dimensions as a function of certain process parameters in accordance with the principles of the present disclosure.

DETAILED DESCRIPTION

The following description is merely exemplary in nature and is not intended to limit the present disclosure, application, or uses. It should be understood that throughout the drawings, corresponding reference numerals indicate like or corresponding parts and features. It should also be understood that various cross-hatching patterns used in the drawings are not intended to limit the specific materials that may be employed with the present disclosure. The cross-hatching patterns are merely exemplary of preferable materials or are used to distinguish between adjacent or mating components illustrated within the drawings for purposes of clarity.

Figure 1:
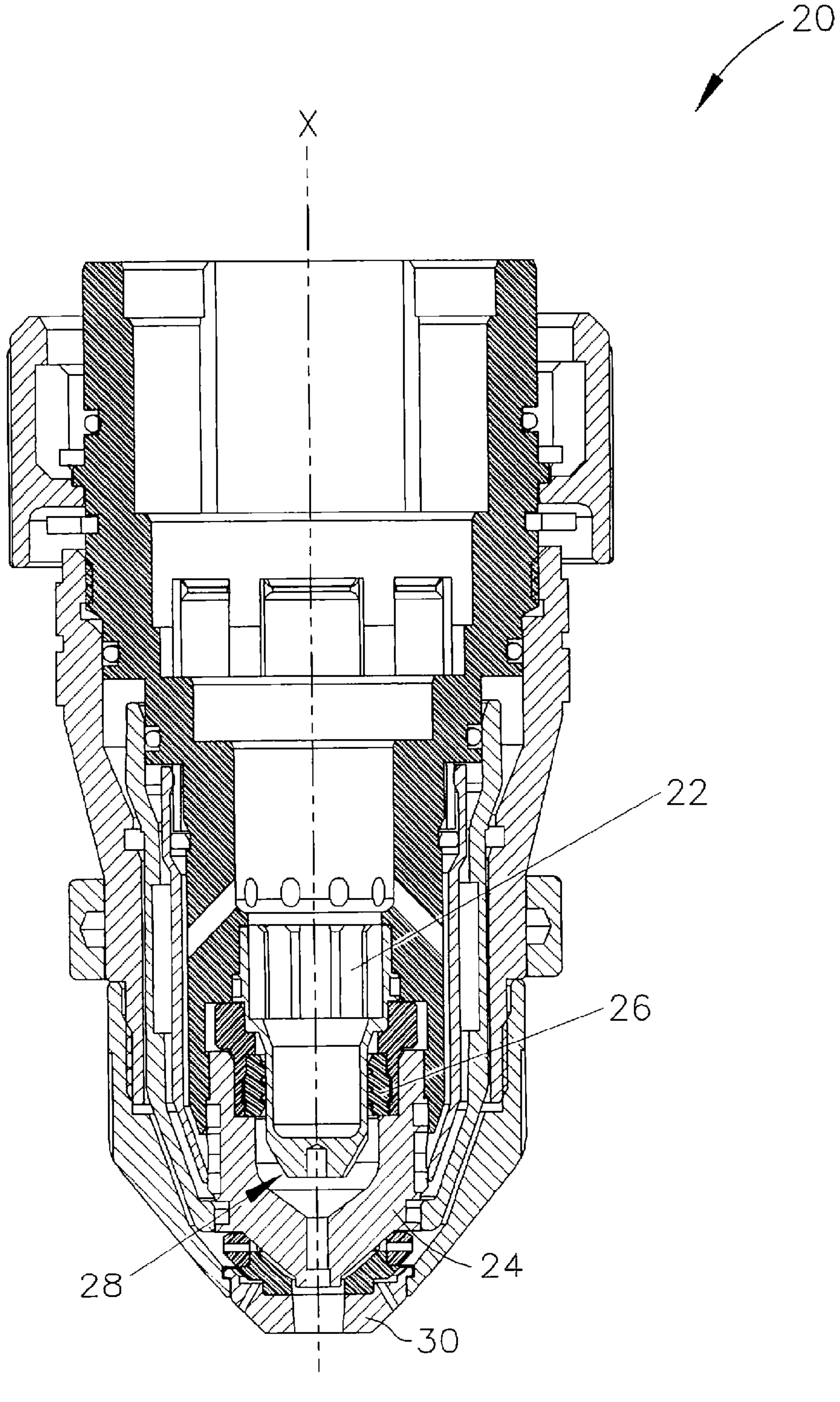
FIG. 1 is a cross-sectional view of a plasma arc torch, including a shield cap with a continuously contoured exit orifice, also referred to herein as a contoured shield orifice, constructed in accordance with the principles of the present disclosure.
Figure 2:
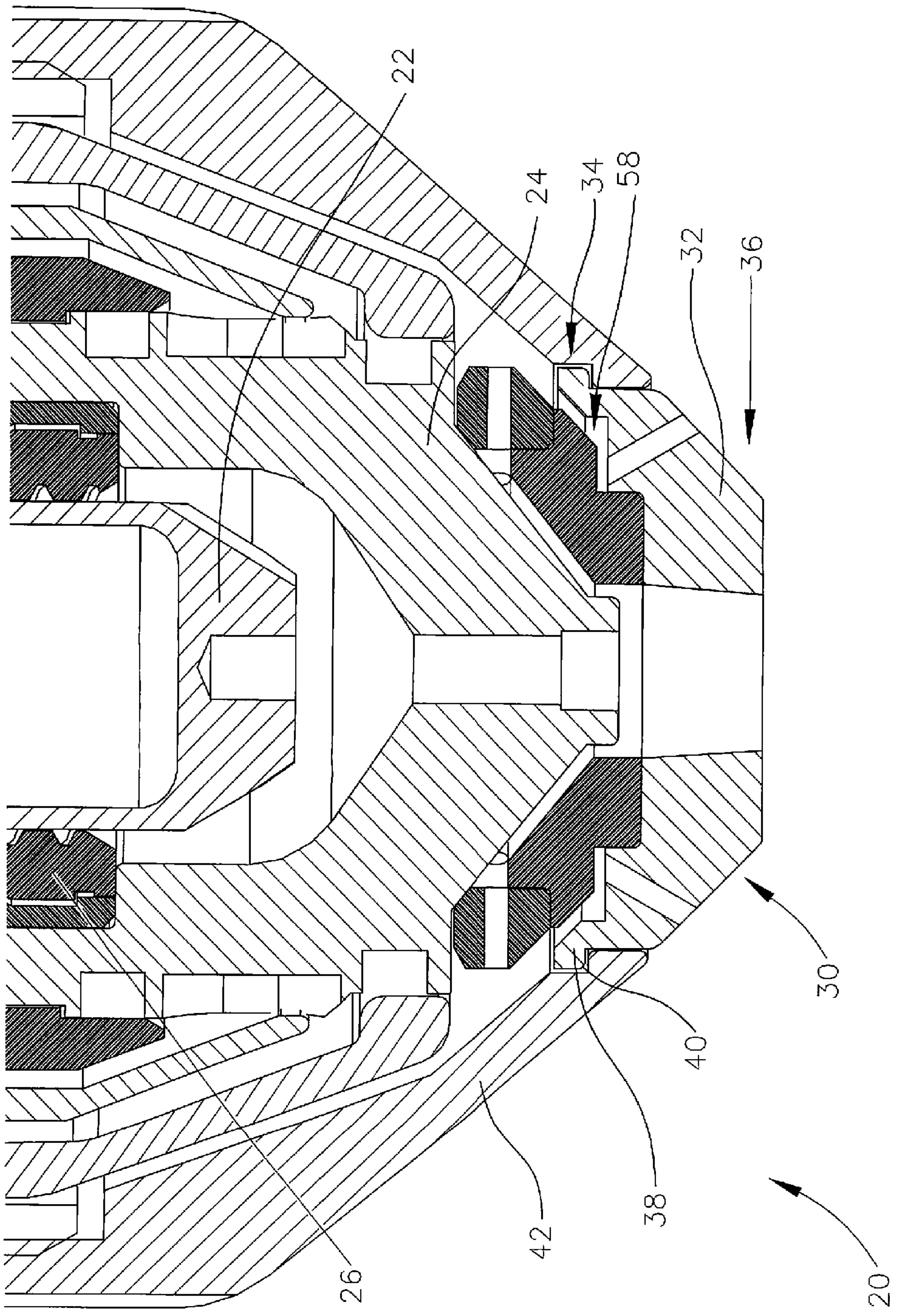
FIG. 2 is an enlarged cross-sectional view of the shield cap with a contoured shield orifice in accordance with the principles of the present disclosure.
Figure 3:
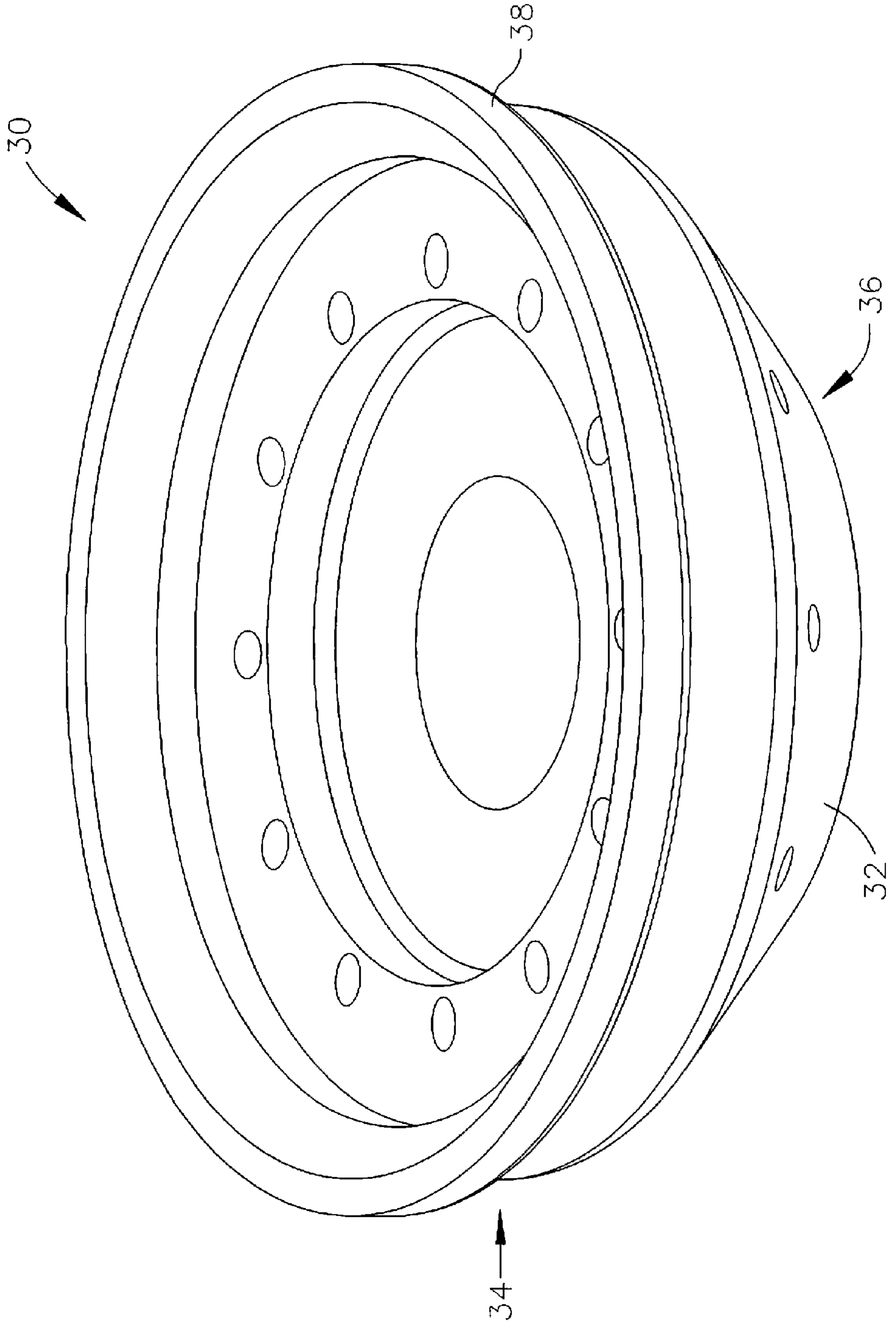
FIG. 3 is a perspective view of the shield cap in accordance with the principles of the present disclosure.
Figure 4:
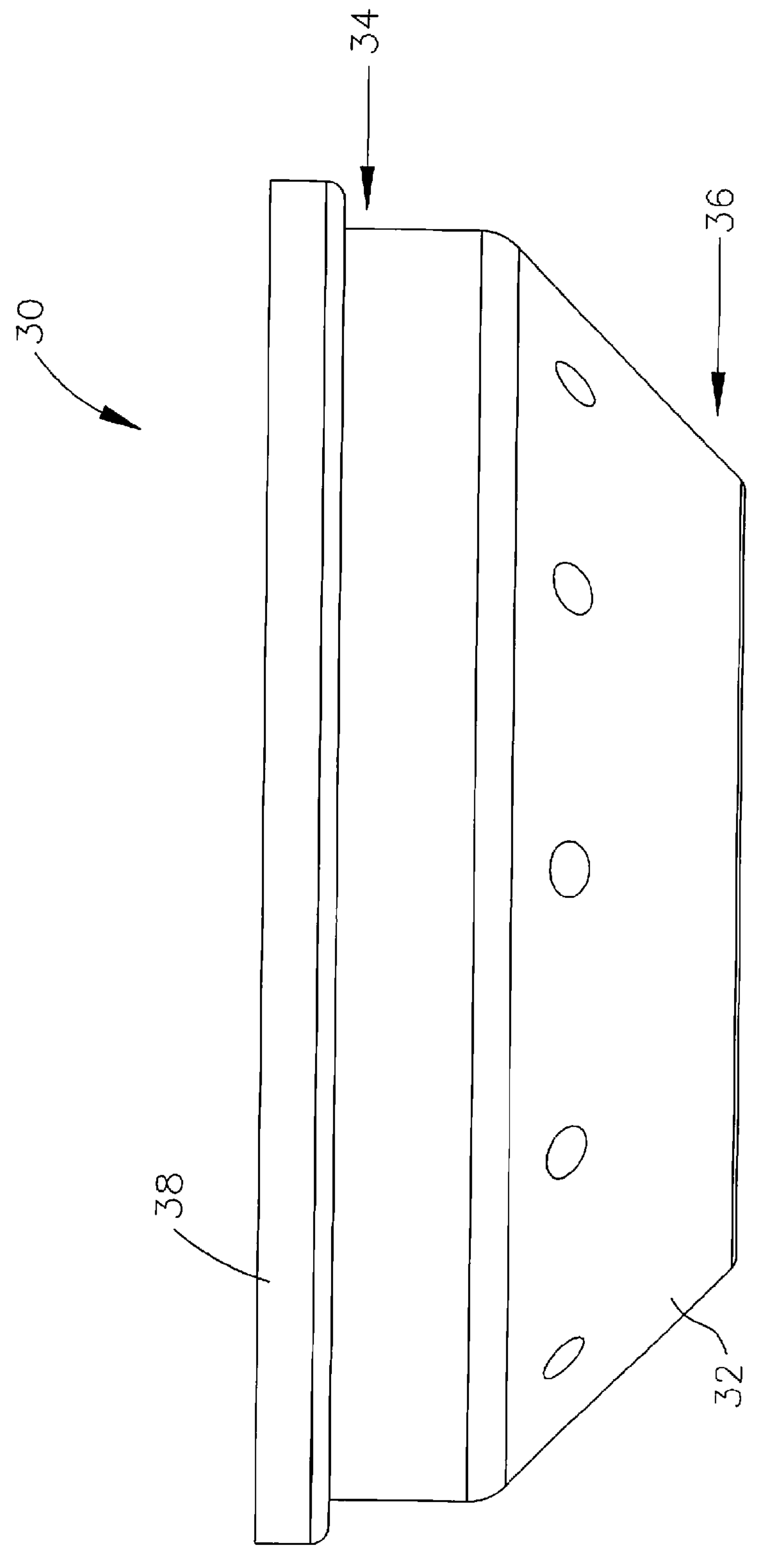
FIG. 4 is a side view of the shield cap in accordance with the principles of the present disclosure.
Figure 5:
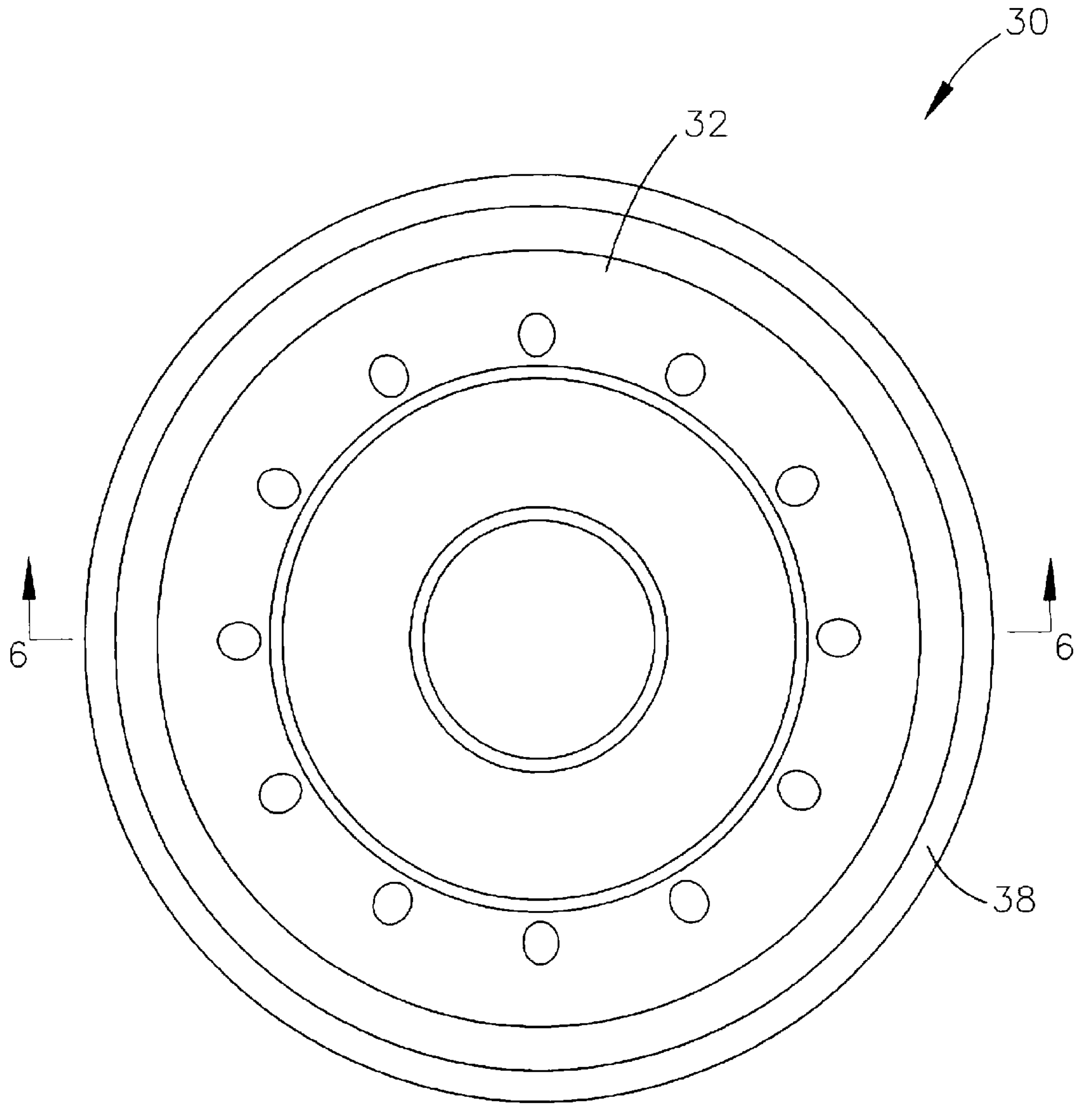
FIG. 5 is a top view of the shield cap in accordance with the principles of the present disclosure.

Referring to FIGS. 1 and 2, a plasma arc torch is illustrated and generally indicated by reference numeral 20. The plasma arc torch 20 generally includes a plurality of consumable components, including by way of example, an electrode 22 and a tip 24, which are separated by a gas distributor 26 (shown as two pieces) to form a plasma arc chamber 28. The electrode 22 is adapted for electrical connection to a cathodic, or negative, side of a power supply (not shown), and the tip 24 is adapted for electrical connection to an anodic, or positive, side of a power supply during piloting. As power is supplied to the plasma arc torch 20, a pilot arc is created in the plasma arc chamber 28, which heats and subsequently ionizes a plasma gas that is directed into the plasma arc chamber 28 through the gas distributor 26. The ionized gas is blown out of the plasma arc torch and appears as a plasma stream that extends distally off the tip 24. A more detailed description of additional components and overall operation of the plasma arc torch 20 is provided by way of example in U.S. Pat. No. 7,019,254 titled "Plasma Arc Torch," and its related applications, which are commonly assigned with the present disclosure and the contents of which are incorporated herein by reference in their entirety.

The consumable components also include a shield cap 30 that is positioned distally from the tip 24 and which is isolated from the power supply. The shield cap 30 generally functions to shield the tip 24 and other components of the plasma arc torch 20 from molten splatter during operation, in addition to directing a flow of shield gas that is used to stabilize and control the plasma stream. Additionally, the gas directed by the shield cap 30 provides additional cooling for consumable components of the plasma arc torch 20, which is described in greater detail below. Preferably, the shield cap 30 is formed of a copper, copper alloy, stainless steel, or ceramic material, although other materials that are capable of performing the intended function of the shield cap 30 as described herein may also be employed while remaining within the scope of the present disclosure.

More specifically, and referring to FIGS. 2-6, the shield cap 30 comprises a body 32 defining a proximal end portion 34 and a distal end portion 36. The proximal end portion 34 is configured to secure the shield cap 30 to the plasma arc torch 20 and in one form includes an annular flange 38 extending around the periphery of the proximal end portion 34. The annular flange 38 abuts a corresponding annular recess 40 formed in the outer shield cap 42 as shown in FIG. 2, which positions the shield cap 30 within the plasma arc torch 20. It should be understood that the annular flange 38 is merely exemplary and that other approaches to securing the shield cap 30 within the plasma arc torch 20, e.g., threads or a quick-disconnect, may be employed while remaining within the scope of the present disclosure.

Figure 6:
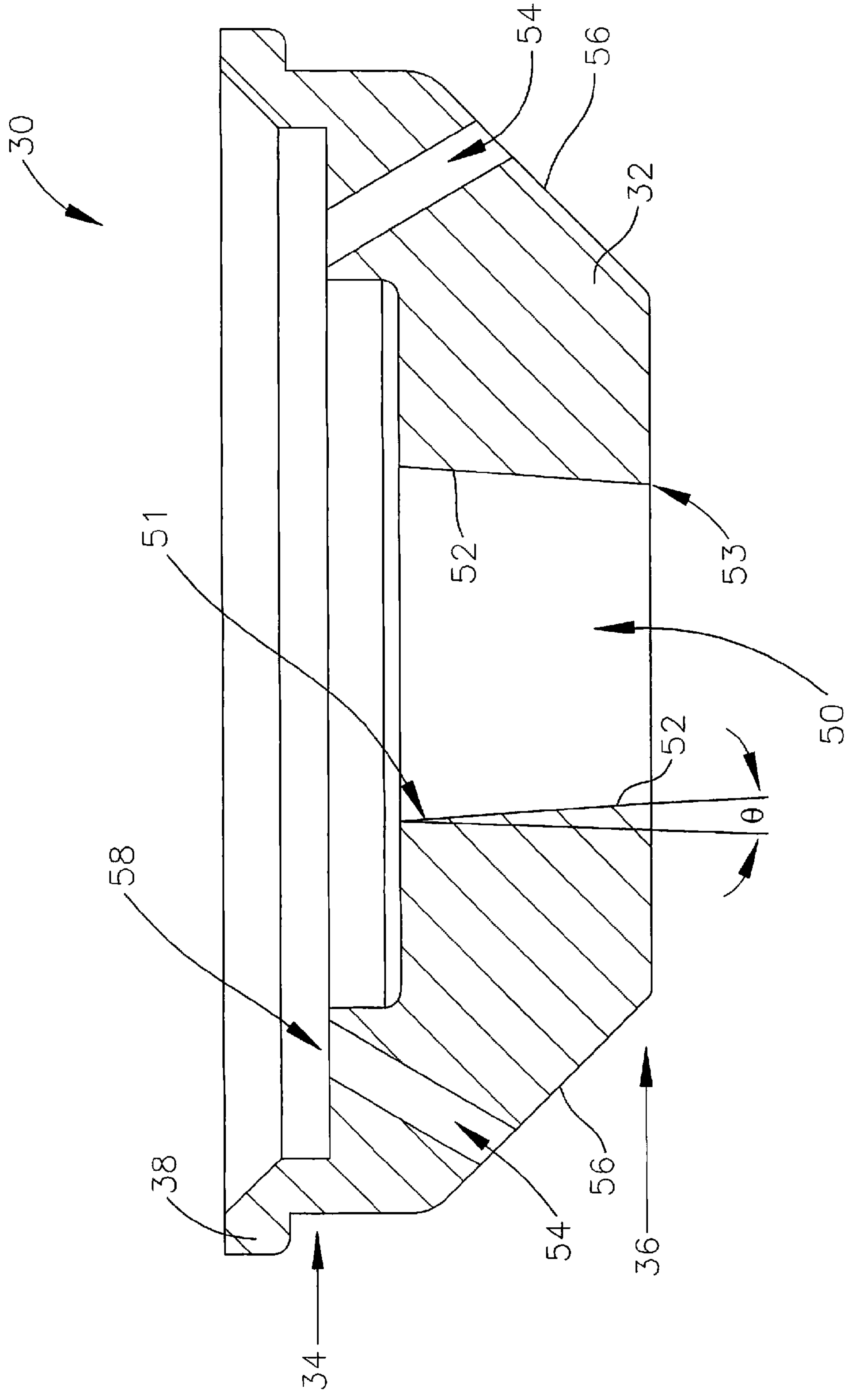
FIG. 6 is a cross sectional-view, taken along line 6-6 of FIG. 5, of the shield cap in accordance with the principles of the present disclosure.

As shown in greater detail in FIG. 6, the shield cap 30 comprises a continuously contoured exit orifice 50 extending through a central portion of the body 32. In this illustrative embodiment, the continuously contoured exit orifice 50 includes a contoured surface 52 that gradually converges from a larger diameter towards the proximal end portion 34 to a smaller diameter towards the distal end portion 36. As such, the continuously contoured exit orifice 50 gently introduces the shield gas around the plasma stream rather than impinging on the plasma stream with a relatively high radial component as with other shield cap designs in the art. By gently introducing the shield gas around the plasma stream, piercing capacity is increased because the energy density of the plasma stream is increased. The orientation of the continuously contoured exit orifice 50 intentionally directs shield gas at the pierce or cut location of the plasma stream, and thus the shield gas is capable of directing molten metal away from the cut, which is described in greater detail below. Additionally, since a higher percentage of shield gas makes its way through the kerf of the cut, molten metal is more easily ejected from the bottom of the workpiece and has less of a tendency to bridge the gap of the cut, which often occurs at higher cutting speeds. Moreover, higher cut quality results due to a decrease in top edge rounding, a decrease in top dross, and improved squareness of the cut face, all from the injection of the shield gas at the pierce or cut location.

As used herein, the term "continuously contoured" shall be construed to mean an orifice geometry that defines a continuously changing cross-sectional size along the length of the orifice from an inlet portion 51 to an outlet portion 53 such that the size of the orifice is different from one location to the next successive location along the length of the orifice. By way of example, the continuously contoured exit orifice 50 illustrated in FIG. 6 defines a convergent configuration, wherein the diameter of the orifice continuously decreases along the length of the continuously contoured exit orifice 50. More specifically, the continuously contoured exit orifice 50 and its contoured surface 52 define an angled geometry having a shield angle θ as shown. In some forms of the present disclosure, the shield angle of the continuously contoured exit orifice 50 is between approximately 4° and approximately 6°, however, other angles may be employed according to the pierce or cut locations as described below while remaining within the scope of the present disclosure.

Referring to FIGS. 7*a* and 7*b*, different shield angles θ and θ' are illustrated that result in different pierce or cut locations on a workpiece 10.

As shown in FIG. 7*a*, the shield angle θ, with the given torch height "h," results in a pierce or cut location X that is approximately in the center of the thickness "t" of the workpiece 10. For a thicker workpiece 10', it may be desirable to have the pierce or cut location X' deeper within the thickness t' as shown in FIG. 7*b*, and thus a different shield angle θ' that is smaller would be employed, again with the given torch height h. Similarly, for a thinner workpiece (not shown), it may be desirable to have the pierce or cut location X shallower within the thickness t. Accordingly, the shield angle θ of the continuously contoured exit orifice 50 can be changed such that the continuously contoured surface 52 directs a flow of shield gas at a predetermined angle to result in a specific pierce or cut location on the workpiece 10.

Referring back to FIG. 6, the shield cap 30 also comprises optional vent passageways 54 formed through outer angled walls 56 of the body 32 and extending into a proximal interior cavity 58. The vent passageways 54 may be configured outwardly as shown or may be directed axially or inwardly, in order to provide the requisite amount of cooling for the plasma arc torch 20 and protection for components within the distal end of the plasma arc torch 20, especially during piercing. Accordingly, the specific number and orientation of vent passageways 54 as illustrated herein should not be construed as limiting the scope of the present disclosure. It should also be understood that the shield cap 30 may be formed without the vent passageways 54 while remaining within the scope of the present disclosure.

In operation, and according to a method of the present disclosure, a shield gas is directed through a central exit orifice, e.g., the continuously contoured exit orifice 50, of the shield cap 30 along a contoured path relative to the longitudinal axis X of the plasma arc torch 20. The contoured path may be oriented inwardly as with the convergent configuration illustrated and described, or the contoured path may be oriented outwardly, or a combination of inwardly and outwardly, as described in greater detail in the following embodiments.

Referring to FIG. 8*a*, another form of a shield cap having a continuously contoured exit orifice is illustrated and generally indicated by reference numeral 60. In this embodiment, a continuously contoured exit orifice 62 defines a divergent configuration with a divergent contoured surface 64, wherein the diameter of the orifice 62 continuously increases along the length of the continuously contoured exit orifice 62 from an inlet portion 63 to an outlet portion 65. In such an embodiment, the shield gas flow is increased to achieve improved cooling and protection of the shield cap 60 and tip 24 from metal splatter during piercing and cutting of the plasma arc torch 20.

As shown in FIG. 8*b*, another form of a shield cap having a continuously contoured exit orifice is illustrated and generally indicated by reference numeral 70. In this embodiment, a continuously contoured exit orifice 72 defines a convergent-divergent configuration, wherein the diameter of the orifice continuously decreases along a portion of the length of the orifice 72 and then continuously increases along the length of the orifice 72. More specifically, the continuously contoured exit orifice 72 defines an upper convergent surface 74, followed by a lower divergent surface 76, such that the size of the orifice 72 is different from one location to the next successive location along the length of the orifice 72. In such an embodiment, the speed and momentum of the shield gas is significantly increased to improve the piercing capability of the plasma arc torch 20.

Referring now to FIG. 8*c*, yet another form of a shield cap having a continuously contoured exit orifice is illustrated and generally indicated by reference numeral 80. Rather than a linear or angled configuration as previously illustrated, a continuously contoured exit orifice 82 defines a non-linear surface (e.g., B-surface) 83 that gradually converges and/or diverges according to specific cutting requirements. Therefore, it should be understood that a variety of shapes for the continuously contoured exit orifices may be employed while remaining within the scope of the present disclosure and that the continuously contoured exit orifices illustrated and described herein are merely exemplary and should not be construed as limiting the scope of the present disclosure. Additionally, the continuously contoured exit orifices may be asymmetrical about a longitudinal axis X of the shield caps, rather than symmetrical as illustrated herein.

Referring now to FIG. 9*a*, a shield cap according to the principles of the present disclosure comprising a plurality of pieces rather than a single piece construction as previously shown and described is illustrated and generally indicated by reference numeral 90. Preferably, the shield cap 90 comprises an outer body 92 and an insert 94 disposed within a central portion of the outer body 92. The insert 94 may be secured to the outer body 92 using a press fit or other mechanical approaches such as threads, or the insert 94 may be adhesively bonded or welded to the outer body 92. As shown, the insert 94 comprises a continuously contoured exit orifice 96, which is shown in a convergent configuration with a convergent surface 98 by way of example but may take on any of the forms as illustrated and described herein. In one alternate form of the shield cap 90, gas passageways 100 (shown dashed) are disposed between the outer body 92 and the insert 94 as shown in order to direct a flow of secondary gas around the plasma stream. Additionally, vent passageways 102 may be employed as described herein to further direct the flow of secondary gas, or the shield cap 90 may be employed without the vent passageways 102.

Referring to FIG. 9*b*, a shield cap with a plurality of pieces that are stacked vertically rather than horizontally is illustrated and generally indicated by reference numeral 110. Preferably, the shield cap 110 comprises an upper body 112 and an end cap 114 that is secured to the upper body 112. The end cap 114 may be secured using a press fit or other mechanical approaches such as threads, or the end cap 114 may be adhesively bonded or welded to the upper body 112. As shown, the combination of the upper body 112 and the end cap 114 defines a convergent-divergent continuously contoured orifice 116, however, the end cap 114 may be interchangeable such that different configurations (continuously convergent, continuously divergent, convergent-divergent, divergent-convergent, among others) may be employed in accordance with the principles of the present disclosure. In one alternate form of the shield cap 110, vent passageways 120 (shown dashed) are formed between the upper body 112 and the end cap 114, wherein the vent passageways 120 are formed through the continuously contoured surfaces 113 and 115. Additionally, vent passageways as previously described herein may also be employed to further direct the flow of secondary gas.

The alternate form of venting through the contoured orifice is illustrated in another form in FIG. 10, wherein a shield cap 130 comprises a continuously contoured orifice 132 defining a non-linear surface 134. With such a non-linear surface 134, recirculation of the flow would likely occur as the shield gas is redirected towards the narrow portion 136. Accordingly, a vent passageway 138 is formed through the continuously contoured non-linear surface 134 to reduce these flow disturbances. The vent passageway 138 extends from the interior cavity 140, through the continuously contoured non-linear surface 134, and into the continuously contoured orifice 132. The vent passageway 138 then continues through the other side of the continuously contoured non-linear surface 134 and is vented to atmosphere. It should be understood that the vent passageway 138 may alternately be in communication with another chamber or other location rather than to atmosphere as illustrated herein while remaining within the scope of the present disclosure. Additionally, different sources of gas (not shown) may be employed to direct flow within the continuously contoured orifice 132 rather than tapping into the shield gas flow as illustrated.

Turning now to FIG. 11, the continuously contoured orifice according to the principles of the present disclosure may be employed with a different component other than the shield cap as previously illustrated and described. As shown, a continuously contoured orifice 150 is disposed within a shield gas distributor 152, by way of example. The shield gas distributor 152 is disposed between the tip 24 and a shield cap 154 and defines a straight portion 156 and a continuously contoured surface 158. The continuously contoured surface 158 is illustrated as converging only by way of example, and it should be understood that the other configurations as illustrated and described herein may also be employed while remaining within the scope of the present invention. Further, the shield cap 154 defines a constant diameter orifice 160 as shown. In operation, the shield gas is first directed coaxially with the tip 24, then at an angle relative to the longitudinal axis of the plasma arc torch, and then coaxially again as it travels along the constant diameter orifice 160 of the shield cap 154. Accordingly, components other than a shield cap can be employed that comprise a continuously contoured surface extending along the component, which directs a flow of shield gas at a predetermined angle to result in a specific pierce or cut location on a workpiece.

It should be understood that although generally circular/cylindrical orifice configurations are illustrated herein, other geometrical shapes may also be employed while remaining within the scope of the present disclosure. Such geometrical shapes may include, by way of example, elliptical, rectangular, or other polygonal configurations. Additionally, the term "continuously contoured surface" shall be construed to include both the singular and plural forms such that a plurality of geometrical surfaces joined together may form a single continuously contoured surface as used herein.

As shown in FIG. 12, yet another form of the present disclosure is shown wherein the continuously contoured surfaces are defined by a plurality of components rather than a single component. A tip 170 defines an outer continuously contoured surface 172, a gas distributor 174 (or spacer) defines an internal continuously contoured surface 176, and a shield cap 178 defines an internal continuously contoured surface 180. Together, these continuously contoured surfaces 172, 176, and 180 cooperate to direct a flow of shield gas at a predetermined angle to result in a specific pierce or cut location on a workpiece as previously described. As such, the teachings of the present disclosure are not limited to a contoured shield orifice for a shield cap or to a contoured surface along single component, but may also be employed with a plurality of components of a plasma arc torch.

Referring to FIG. 13, the shape or configuration of the continuously contoured exit orifice 50 is illustrated as a function of at least the following process parameters: (1) current; (2) the amount of secondary gas flow; (3) standoff distance from the shield cap 30; (4) the composition of the plasma gas and the shield gas; and (5) the outer geometry of the tip. Accordingly, a variety of dimensions for the shield cap 30 and surrounding components may be altered according to a given set of process parameters. By way of example, Table I below includes a listing of dimensions for the shield cap 30 to illustrate the shape or configuration of the continuously contoured exit orifice 50 being a function of these process parameters.

TABLE 1

| | Design 1 | Design 2 |
|---|---|---|
| Shield Angle: θ | 4° | 6° |
| Shield Length: L | 0.153" | 0.140" |
| Top Shield Diameter: $D_T$ | 0.212" | 0.230" |
| Bottom Shield Diameter: $D_B$ | 0.191" | 0.201" |
| Diameter of Nozzle: $D_N$ | 0.180" | 0.200" |
| Nozzle to Shield Distance: $L_{TS}$ | 0.180" | 0.170" |
| Work Height (Torch to plate) | 0.140"-0.200" | 0.140"-0.200" |

It should be understood that these process parameters and dimensions are illustrative and thus should not be used to limit the scope of the present disclosure.

The description of the disclosure is merely exemplary in nature and, thus, variations that do not depart from the substance of the disclosure are intended to be within the scope of the invention. Such variations are not to be regarded as a departure from the spirit and scope of the invention.

What is claimed is:

1. A plasma arc torch comprising:

an electrode disposed within the plasma arc torch and adapted for electrical connection to a cathodic side of a power supply;

a tip positioned distally from the electrode and adapted for electrical connection to an anodic side of the power supply during piloting; and a shield cap positioned distally from the tip and electrically isolated from the power supply, the shield cap comprising an exit orifice that defines a continuously changing cross-sectional size along the length of the exit orifice from an inlet portion to an outlet portion at a distal end of the shield cap, wherein the continuously changing cross-sectional size is configured to direct a shield gas at a pierce or cut location on a workpiece.

2. The plasma arc torch according to claim 1, wherein the exit orifice defines a convergent configuration.

3. The plasma arc torch according to claim 1, wherein the exit orifice defines a divergent configuration.

4. The plasma arc torch according to claim 1, wherein the exit orifice defines a convergent-divergent configuration.

5. The plasma arc torch according to claim 1, wherein the exit orifice defines an angled geometry having a shield angle.

6. The plasma arc torch according to claim 5, wherein the shield angle is between approximately 4° and approximately 6°.

7. A shield cap for use in a plasma arc torch comprising:

a body defining a proximal end portion having an attachment area for securing the shield cap to the plasma arc torch; and an exit orifice extending through a central portion of the body, the exit orifice defining a continuously changing cross-sectional size along the length of the exit orifice from an inlet portion to an outlet portion at a distal end of the body, wherein the continuously changing cross-sectional size is configured to direct a shield qas at a pierce or cut location on a workpiece.

8. The shield cap according to claim 7, wherein the exit orifice defines a convergent configuration.

9. The shield cap according to claim 7, wherein the exit orifice defines a divergent configuration.

10. The shield cap according to claim 7, wherein the exit orifice defines a convergent-divergent configuration.

11. The shield cap according to claim 7 further comprising a plurality of vent passageways extending around a peripheral portion of the body.

12. The shield cap according to claim 11, wherein the vent passageways are directed outwardly.

13. The shield cap according to claim 11, wherein the vent passageways are directed inwardly.

14. A shield cap for use in a plasma arc torch comprising an exit orifice extending through a central portion of the shield cap, the exit orifice defining an inlet portion, an outlet portion that meets a plasma stream, and a continuously changing cross-sectional size along the length of the exit orifice from the inlet portion to the outlet portion, wherein the continuously changing cross-sectional size is configured to direct a shield gas at a pierce or cut location on a workpiece.

15. The shield cap according to claim 14, wherein the exit orifice defines a convergent configuration.

16. The shield cap according to claim 14, wherein the exit orifice defines a divergent configuration.

17. The shield cap according to claim 14, wherein the exit orifice defines a convergent-divergent configuration.

18. The shield cap according to claim 14, wherein the shield cap comprises a single piece.

19. The shield cap according to claim 14, wherein the shield cap comprises a plurality of pieces.

20. The shield cap according to claim 19, wherein the shield cap comprises:

an outer body;

an insert disposed within the outer body, the insert comprising the exit orifice extending through a central portion of the insert; and at least one gas passageway disposed between the outer body and the insert.

21. The shield cap according to claim 14 further comprising at least one vent passageway formed through a surface defined between the inlet portion and the outlet portion.

22. A component for use in a plasma arc torch comprising an orifice that defines a continuously changing cross-sectional size along the length of a surface of the orifice from an inlet portion to an outlet portion such that the size of the orifice is different from one location to the next successive location along the length of the surface of the orifice, the surface directing a flow of shield gas at a predetermined angle to result in a specific pierce or cut location on a workpiece, wherein the continuously changing cross-sectional size is configured to direct a shield gas at a pierce or cut location on a workpiece.

23. The component according to claim 22, wherein the component is selected from the group consisting of a shield cap, a gas distributor, a spacer, and a tip.

* * * * *